United States Patent [19]
Berta

[11] Patent Number: 4,833,818
[45] Date of Patent: May 30, 1989

[54] METHOD FOR EXTERMINATING SUBTERRANEAN ANIMALS

[76] Inventor: Victor T. Berta, 1885 Grandview Ct., Idaho Falls, Id. 83402

[21] Appl. No.: 141,823

[22] Filed: Jan. 11, 1988

[51] Int. Cl.[4] ............................................. A01M 7/00
[52] U.S. Cl. .................................... 43/124; 43/132.1
[58] Field of Search .................... 43/124, 125, 132.1, 43/144

[56] References Cited

U.S. PATENT DOCUMENTS

| | | | |
|---|---|---|---|
| 841,297 | 1/1907 | Wyard | 43/124 |
| 1,309,193 | 7/1919 | Garrison | 43/125 |
| 1,492,732 | 5/1924 | Knopf | 43/124 |
| 1,529,785 | 3/1925 | Hammond et al. | 43/125 |
| 1,948,228 | 2/1934 | Urban | 43/132.1 |
| 2,780,025 | 2/1957 | Finnigan | 43/124 |
| 3,029,558 | 4/1962 | Odenkirk | 47/1 |
| 3,685,431 | 8/1972 | Stone | 99/253 |
| 4,005,976 | 2/1977 | Rombach | 43/124 |
| 4,026,330 | 5/1977 | Dunn | 43/124 |
| 4,597,217 | 7/1986 | Narita | 43/124 |
| 4,624,070 | 11/1986 | Query | 43/124 |
| 4,637,161 | 1/1987 | Turner | 43/132.1 |
| 4,640,044 | 2/1987 | Varnon | 43/132.1 |
| 4,667,436 | 5/1987 | Benson | 43/132.1 |

OTHER PUBLICATIONS

Lindsey, J. S. Carbon Dioxide, *Encyclopedia of Science and Technology*, vol. 2 pp. 585–586.
Cooper, Nancy, Cameroon's Valley of Death, *Newsweek*, Sep. 8, 1986, pp. 26–28.
Begley, Sharon, The Wrath of Lake Nios: How It Killed, *Newsweek*, Sep. 8, 1986, p. 28.
Weisburg, S., The 'The Killer Lake' of Cameroon, *Science News*, vol. 128, pp. 356–357.

*Primary Examiner*—Kurt Rowan
*Attorney, Agent, or Firm*—Hopkins, French, Crockett Springer & Hoopes

[57] ABSTRACT

A suffocant in the form of a heavier-than-air gas is directed into the subterranean tunnel network of a burrowing air-breathing animal so as to replace the air from such tunnels and suffocate the animals therein. The heavier-than-air gas is preferably odorless, tasteless, colorless and substantially chemically inert, and injected at conditions approximately standard temperature and pressure, so as not to provide a warning to the burrowing animals. The heavier-than-air gas is preferably $CO_2$, and is injected at a rate of from about 2 to about 10 L/minute. The heavier-than-air gas is injected into a cover member which overlies at least one tunnel outlet in the case of mammals (e.g. gophers) or a plurality of tunnel outlets in the case of insects (e.g. fire ants).

5 Claims, 1 Drawing Sheet

METHOD FOR EXTERMINATING SUBTERRANEAN ANIMALS

BACKGROUND OF THE INVENTION

The present invention relates to a method and apparatus for the extermination of subterranean burrowing air-breathing animals, such as ants, moles, gophers, etc.

Numerous attempts have been made to provide non-toxic methods of exterminating obnoxious burrowing animals which do not at the same time result in the extermination of beneficial adjacent animals, such as earthworms. For instance, U.S. Pat. No. 4,597,217 discloses a method of suffocating field mice in their underground burrows. Liquid nitrogen is poured into the burrow and then evaporates to fill the burrow with gaseous nitrogen, causing the suffocation of any field mouse in the burrow. An enclosure is placed over one of the burrow exits so as to require the evaporated nitrogen to be forced to another burrow exit for escape. However, if the subterranean burrow network is extensive, with many different levels therein, the evaporated nitrogen (being less dense than ambient air) will diffuse upwardly and follow the most direct path to escape from the remote burrow exit, thereby possibly bypassing a substantial portion of the subterranean burrow network. U.S. Pat. No. 4,640,044 discloses a transparent hood or cover which is placed over an ant mound, thereby raising the temperature within the mound sufficiently to kill the ants within the nest. A lens may be provided within the hood to intensify the greenhouse-effect heating therein. While this invention will undoubtedly result in extremely high temperatures in the upper portions of an ant mound, it will have relatively little effect on ants within the subterranean burrows located a number of feet beneath the earth's surface.

U.S. Pat. No. 4,637,161 discloses a steam-injection means for injecting steam into the underground habitat of insects or burrowing animals. A tubular ground probe is inserted into the burrow, with a downwardly opening shield to maintain the steam under ground. Vents are provided on the shield to vent steam escaping from the ground around the probe. Steam may be injected at different depths simultaneously. Likewise, U.S. Pat. No. 4,667,436 discloses an apparatus having a probe which is inserted into an ant mound. Electric current is directed through the probe so as to electrocute ants within the mound.

U.S. Pat. No. 3,029,558 discloses a method of soil fumigation wherein a fumigating blanket is placed over a quantity of soil and a fumigating gas is introduced thereunder so as to kill objectionable weeds or insects. Lastly, U.S. Pat. Nos. 3,685,431 and 1,948,228 both disclose methods of killing insects which infest machinery used in the manufacture of grain products. In the '431 patent, grain (and entrained insects) are directed over electrified grids, electrocuting insects therein. A non-explosive atmosphere of inert gas (such as $CO_2$) is introduced into the system to prevent combustion. In the '228 patent, a non-poisonous gas (such as air) is heated to a temperature (at least 130° F. and preferably 200° F.) sufficient to destroy insects in any stage of life contained either in the grain or the machinery.

SUMMARY OF THE INVENTION

Figure 1:
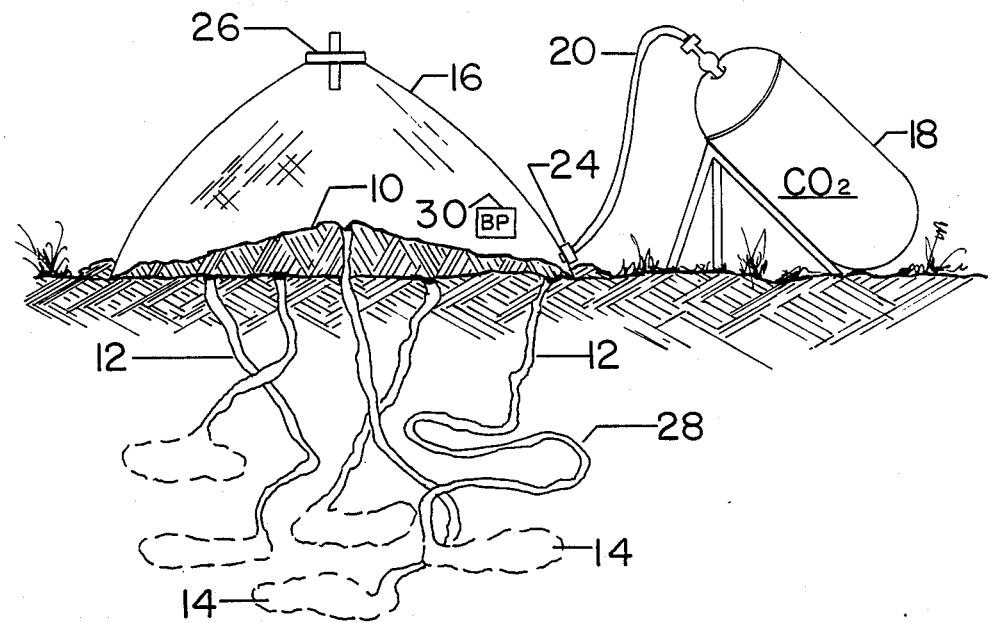
FIG. 1 is an elevational view of a preferred embodiment of the present invention.

The present invention comprises a method of exterminating subterranean burrowing air-breathing animals which construct subterranean tunnel networks having a plurality of outlets therefrom. Animals such as fire ants, moles, gophers, etc., may construct extensive subterranean tunnel networks, resulting in damage not only to the plot of ground so infested, but possibly also to perennial vegetation resulting from such animals feeding on the roots and vegetation thereof. The present invention utilizes a heavier-than-air suffocating gas which remains in gaseous form at ambient temperatures. The gas is introduced into the tunnel network from one of the exits over sufficient time and in sufficient quantity to substantially fill the entire subterranean tunnel network with such gas. A cover member may be provided over the tunnel exit into which the heavier-than-air gas is introduced so as to insure that the gas is directed into the tunnel and not into ambient air. While any heavier-than-air gas which results in suffocation of air-breathing animals will function to some degree in the process of this invention, for purposes of economy, availability and safety, $CO_2$ is the preferred heavier-than-air gas.

It is preferred that the heavier-than-air gas be introduced into the subterranean tunnel network at conditions of standard temperature and pressure (STP) so as not to alert the intended victims to permit their escape prior to suffocation. For instance, the heavier-than-air gas can be introduced at a rate of from about 5-10 L/minutes. The heavier-than-air gas is preferably non-toxic and non-detectable in terms of odor, color, taste and nonreactive with the internal metabolism of the victim, so as to provide no warning of its presence.

Therefore, the present invention provides a safe, inexpensive and highly effective method of exterminating subterranean air-breathing animals, without alerting the victims to the presence of the suffocating medium.

DETAILED DESCRIPTION OF THE INVENTION

While the bulk of the description of the preferred embodiment of the present invention will be directed toward the eradication or extermination of fire ants, it is to be understood that the present invention is equally susceptible for extermination of any other subterranean insect, as well as subterranean burrowing mammals, such as gophers, field mice, voles, etc.

Fire ants were introduced into the United States in about 1940 and have subsequently infested a substantial portion of the southern and southeastern portion of the United States from North Carolina to Texas. Almost $175 million has been spent by the federal government in an attempt to control the ants, all to no avail. A single fire ant colony may contain as many as 250,000 workers, and as many as 100 queens per colony. Attempts to eliminate or control the insect with chemical insecticides are controversial and to a large extent self-defeating. Broad-target toxicants used in the 1950's resulted in the death of many beneficial animals. Myrex ®, a more specific insecticide used extensively until the late 1970's, was the primary hope for eradication until its banning by the Environmental Protection Agency. Because insecticides intended to eradicate fire ants also kill competitive ant species and fire ant predators, the fast-reproducing fire ants actually benefited from such insecticides—they adapted more quickly to the insecticides and filled the void left by their exterminated competitors. It has been found that infestations of fire ants actually increased between 200 and 3,000 percent on insecticide-treatment plots that originally had low infestations of the insect. Because there are multiple queens in each colony, conventional extermination techniques with poisons are generally ineffective—while a number of the queens may be killed, the "warning" provided by the insecticide permits many, if not most, of the queens to escape. Therefore, Applicant has devised a technique which will not alert the ants to the presence of the exterminating medium, thereby killing all the queens in the colony.

Referring now to FIG. 1, an illustrative ant colony comprises a raised mound portion 10, a plurality of subterranean tunnels 12 and a plurality of subterranean caverns 14 within which the queens lay their eggs. The subterranean caverns 14 may be located at any point from several inches to as much as three feet below the surface of the ground. As shown in the drawing, a preferred embodiment of the present invention comprises a cover member 16, a container 18 for a quantity of compressed heavier-than-air gas, and a conduit for connecting the container 18 to the cover member 16. Preferably, the cover member 16 is an air-tight container, in that dirt may be bermed around the base of the cover member (as at 22) so as to prevent the heavier-than-air gas leaking therefrom. A gas inlet means in the form of an aperture or valve 24 is provided in a lowermost portion of cover member 16 so s to introduce the suffocant at or near ground level. A record aperture 26 can be provided at an uppermost portion of cover member 16 to permit ambient air in the airspace beneath the cover member 16 to escape.

In operation, the suffocant can be injected at a relatively slow rate, such as from about 2 to about 10 liters/min., for a time sufficient to provide suffocant blanket over the ground surface in the airspace, at which time the injection rate can be reduced significantly. A barometric pressure gauge 30 can be provided within the cover member to indicate a positive pressure in the airspace. An automatic valve (not shown) on container 18 can be interconnected with pressure gauge 30 so as to maintain a minimal positive pressure therein.

The present invention relies upon the heavier-than-air nature of a suffocating gas to penetrate throughout the subterranean tunnel and cavern network to completely fill such network, and displace air therefrom. Because such displacement will take some period of time (anywhere from a few minutes to as much as 60–90 minutes) it is important that the gas introduced into such tunnels not alert the insects to be exterminated. Therefore, any gas which is essentially odorless, tasteless, colorless, and which has minimal impact on any other sensory input, can be utilized. Such gas should likewise have little or no physiological impact on the internal metabolism when injested. Because of its low cost and easy availability, $CO_2$ appears to be the ideal candidate for the heavier-than-air gas. Carbon dioxide is about 1.5 times as heavy as air and is stable, inert and non-toxic under ambient air conditions. Ambient air contains approximately 0.033 percent $CO_2$ by volume. An atmosphere containing in excess of about 5% $CO_2$ is believed to be toxic to most aerobic organisms.

It is not known what the exact concentration of $CO_2$ must be in order to produce suffocation in air-breathing subterranean insects such as fire ants. However, in the practice of the present invention, given enough time, substantially all of the ambient air in a subterranean tunnel or cavern network can be replaced by a heavier-than-air gas, producing a concentration which approaches 100%. It is believed that there are few if any burrowing insects which could survive more than a few minutes under such conditions.

While $CO_2$ appears to be the heavier-than-air gas of choice, it is contemplated that a number of other gases could be utilized to suffocate burrowing insects and/or mammals. Such gases include: argon, n-butane and iso butane (however, these gases are flammable and toxic at concentrations above about 2% by volume) and freon-type refrigerants (heavier than $CO_2$ and nonflammable, but relatively costly). While such gases are heavier-than-air and would be toxic at relatively high concentrations to air-breathing insects and mammals, their increased cost and more limited availability render them secondary candidates for use in the process of the present invention.

While it is important that the heavier-than-air gas itself not alert the animals to be suffocated, it is likewise preferable that its manner of injection similarly cause no such alarm. The gas is preferably injected under conditions approximating standard temperature and pressure without substantial change in ambient conditions: injection of a liquid for subsequent evaporation at greatly elevated or lowered temperatures from ambient air would cause such alarm, as would the injection of a heavier-than-air gas under elevated pressures. Therefore, care must be taken to avoid forcing the heavier-than-air gas throughout the subterranean tunnel and cavern network at too great a rate. It is believed that introducing $CO_2$ at a rate of from about 2 to about 10 L/minute is sufficient to replace ambient air in tunnels and caverns within an appropriate time.

The replacement of air with an air substitute such as $CO_2$ will result in "oxygen starvation" and ultimately suffocation of all air-breathing animals in the tunnel and cavern network. Such suffocation can be effected without the need for dangerous chemicals, high pressures or high temperatures. Because the suffocant used herein is heavier-than-air, it will flow to all regions of the subterranean tunnel network, even if there are "rises" in the tunnel, as illustrated at 28 in FIG. 1. Because the static head of the heavier-than-air gas above the rise 28 will continually force the heavier-than-air gas away from the cover member 16, the gas will be forced upwardly at any such rise and thence downwardly again throughout the tunnel.

In the burrow of a gopher, field mouse, etc., the procedure described above will be essentially replicated, although in many cases the volume of the tunnel network will be substantially larger and a concurrent increase in the volume of heavier-than-air gas will be necessary. Such burrows are typically relatively shallow and follow the contour of the surrounding land. Chemical injection, or injection of gases at either increased pressures or lowered temperatures, will provide sufficient warning to enable the animals therein to escape through numerous outlets. Only by replacing all of the oxygen with a suffocant which does not alert the intended victim to its presence, can such animals be eradicated.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention, as set forth in the claims.

I claim:

1. A method for exterminating subterranean burrowing air-breathing animals having a subterranean tunnel network and having at least one surface tunnel outlet, said method consisting essentially of the steps of
   a. placing a cover member over at least one tunnel outlet, said cover member having gas inlet means and defining an enclosed space thereunder;
   b. introducing a suffocant comprising a quantity of gaseous carbon dioxide at conditions of standard temperature and pressure into the enclosed space beneath said cover member through the gas inlet means; and
   c. maintaining the cover member over at least one tunnel outlet to confine the gaseous carbon dioxide in the enclosed space for a time period sufficient to diffuse the gaseous carbon dioxide throughout the subterranean tunnel network, said quantity of gaseous carbon dioxide being sufficient to displace sufficient ambient air from the subterranean tunnel network to cause suffocation of the subterranean burrowing air-breathing animals therein.

2. The method as recited in claim 1, wherein the animals comprise fire ants, said fire ants having a plurality of surface tunnel outlets located adjacent one another in a raised anthill.

3. The method as recited in claim 2, comprising placing the cover member over the anthill.

4. The method as recited in claim 1, comprising introducing the carbon dioxide at a rate which does not change ambient temperature and pressure conditions within the subterranean tunnel network sufficiently to alert the animals therein to the presence of carbon dioxide.

5. The method as recited in claim 1, comprising introducing the carbon dioxide at a rate of from about 2 to about 10 liters per minute.

* * * * *